3,330,728
PROGESTATIONAL COMPOSITIONS COMPRISING 17α - ACETOXY - 6,16α-DIMETHYL PREGNA-4,6-DIENE-3,20-DIONE
Suzanne Patricia Hall, nee Barton, Bernard Ellis, and Vladimir Petrow, London, England, assignors to The British Drug Houses Limited
No Drawing. Filed Sept. 24, 1962, Ser. No. 225,907
Claims priority, application Great Britain, Oct. 12, 1959, 34,548/59
3 Claims. (Cl. 167—74)

This application is a continuation-in-part of our copending application, Ser. No. 60,790 filed Oct. 6, 1960, now Patent No. 3,070,613.

This invention is for improvements in or relating to organic compounds and has particular reference to 17α-acyloxy-6 - methyl-3-oxo - $\Delta^{4,6}$-steroids of the pregnane series having the general Formula I below.

It is an object of the invention to provide novel 17α-acyloxy-6 - methyl-3-oxo - $\Delta^{4,6}$-steroids of the pregnane series which are of value on account of their biological activity and in particular their progestational activity. In addition, the compounds possess in varying degrees the ability to inhibit ovulation in certain animal species.

The present invention provides 17α-acyloxy-6-methyl-3-oxo-$\Delta^{4,6}$-steroids of the pregnane series having the general Formula I

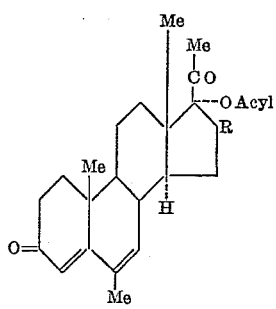

where R is a methyl group and acyl is preferably lower alkanoyl. These compounds may be prepared by the method disclosed and claimed in copending application Serial No. 60,790. This method comprises treating a substituted progesterone or 17-isoprogesterone of the general Formula II

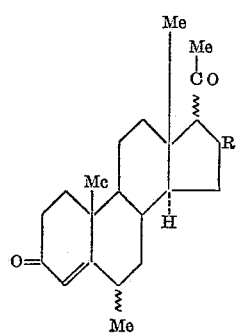

(where R has the same meaning as above) with acetic anhydride to form a 3,20-diacetoxy-6-methylpregna-3,5,17(20)-triene of Formula III

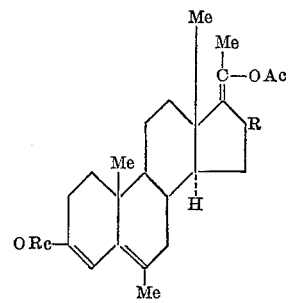

(where R has the same meaning as above), oxidising the 3,5,17(20)-triene (III) with a per-acid to give a 17α,20α-epoxy-6β-hydroxy - 6α-methylpregn - 4-en-3-one of Formula IV

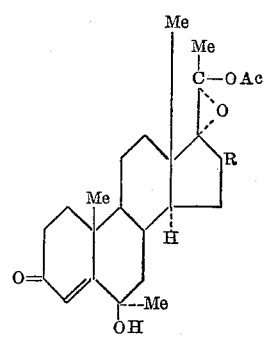

(where R has the same meaning as above), saponifying the 17α,20α-epoxy-6β-hydroxy-6α-methylpregn-4-en-3-one to give the corresponding 17α-hydroxy Compound V

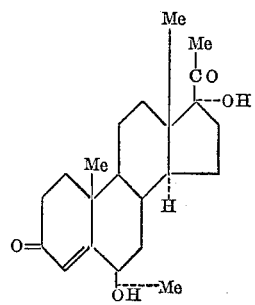

(where R has the same meaning as above), and acylating the 17α-hydroxy group of the foregoing compound when concomitant dehydration of the 6β-hydroxyl group occurs to give the desired Compound I.

The invention in particular provides the new compound 17α-acetoxy-6,16α - dimethylpregna-4,6 - diene-3,20-dione which is of value on account of its progestational activity. Thus, for example, in the McPhail modifications of the Clauberg assay, the substance on oral administration has many times the progestational activity of dimethisterone (6α,21-dimethylethisterone). As dimethylethisterone has about 10 times the progestational activity of ethisterone, the progestational potency of 17α-acetoxy-6,16α-dimethylpregna-4,6-diene-3,20-dione is seen to be of a very high order, thereby rendering it of value in medical practice in the treatment of such conditions as secondary amenorrhoea, menorrhagia, metropathia and dysmenorrhoea.

Unlike 17α-acetoxy - 6-methylpregna - 4,6-diene-3,20-dione, the 6,16α-dimethyl compound of the present invention has the unexpected property of possessing oestrogenic activity which makes it of particular importance as an ovulation inhibitor. At the present time it is generally accepted in the contraceptive field that a progestational agent when used as a contraceptive should be mixed with a very small quantity of an oestrogen.

Also in contrast to 17α-acetoxy-6-methylpregna-4,6-diene-3,20-dione, the 6,16α-dimethyl compound of the present invention is found to have a potent effect upon the salt and water balance of the patient producing a diuretic type of action which has not been observed with the 6-methyl, 16-desmethyl compound. 17α-acetoxy-6,16α-dimethylpregna-4,6-diene-3,20-dione is also of value as an intermediate in the preparation of 6,16-dimethyl corticoidal steroids such as 6,16α-methylprednisolone.

Conversion of the substituted progesterone or 17-isoprogesterone (II; R=H or CH$_3$) into a 3,5,17(20)-triene of Formula III (R=H or CH$_3$) may be achieved, for example, by treating Compound II with a large excess of acetic anhydride and a small amount of an acidic catalyst, such as toluene-p-sulphonic acid. The reaction is facilitated by slow distillation of the mixture at atmospheric pressure, and is substantially complete in a few hours. The product is then isolated by methods well-known to those skilled in the art, and may be purified, if desired, by chromatography over an inert adsorbent, such as acid-washed alumina. Alternatively, the compound of Formula (II) may be treated for several hours at room temperature with a mixture of acetic anhydride, an inert solvent of high dielectric constant such as carbon tetrochloride, and a trace of an acidic catalyst, preferably perchloric acid. The product is then isolated by conventional methods and purified by chromatography if desired. For the purpose of the present invention, however, it is not essential for the 3,5,17(20)-triene (III) to be obtained in pure crystalline condition; the total product of the reaction may, in fact, be employed in its crude state for the next stage of the process.

Oxidation of the 3,5,17(20)-triene (III) to the intermediate (IV) may be effected by treating Compound III in an inert solvent, such as benzene, ether or choloroform, with an excess of a per-acid, such as perbenzoic acid or monoperphthalic acid. The reaction is carried out preferably within the temperature range 5° to 25° C. and is generally complete within 24 hours. The product, containing the intermediate (IV), is isolated by conventional methods and may, without further purification, be converted into material containing the 17α-hydroxy compound (V) by saponification with alkali, for example, by a brief heating under reflux with a dilute solution of sodium or potassium hydroxide in methanol or ethanol. At this stage of the process it is preferable to isolate the 17α-hydroxy compound (V) from the total crude saponification product, and to obtain it in a reasonably pure condition by, for example, crystallisation from a suitable solvent.

Transformation of Compound V into the required 17α-acyloxy-6-methyl-3-oxo-Δ$^{4,6}$-steroid (I) may be accomplished in one operation by treating Compound V in a lower acyl anhydride, or a mixture of lower acyl anhydride and the corresponding lower acyl acid, with a suitable catalyst such as perchloric acid, zinc chloride or toluene-p-sulphonic acid. The reaction is best carried out at room temperature and is complete in a relatively short time. The product is then isolated, and may be purified by well-known techniques such as chromatography and crystallisation.

Following is a description, by way of example, of methods for carrying the invention into effect.

EXAMPLE 1

A solution of 6α-16α-dimethylprogesterone (Belgian Patent No. 576,418 granted Mar. 31, 1957) (15.75 g.) and toluene-p-sulphonic acid (6 g.) in acetic anhydride (1.6 l.) was gently boiled, the solvent being permitted to distill during 7 hours. The residual dark mixture (150 ml.) was treated with water, and the product isolated with ether. Light petroleum (200 ml.; B.P. 40 to 60° C.) was added to its solution in ether (100 ml.), a small precipitate of dark amorphous material was removed by filtration, and the filtrate was passed through a column of acid-washed alumina (200 gm.). Elution with ether/light petroleum (2:1) gave a viscous gum which was dissolved in ether (100 ml.) and treated for 24 hours with a solution of monoperphthalic acid (23 g.) in ether (350 ml.). The mixture was then washed with aqueous sodium carbonate, water, dried and the solvent removed. A solution of the residue in methanol (80 ml.) and water (20 ml.) containing potassium hydroxide (3 g.) was heated under reflux for 10 minutes and neutralised with acetic acid, cooled and filtered. The product had a M.P. 270 to 274° C. It was purified from a large volume of methanol giving 6β,17α-dihydroxy - 6α,16α-dimethylpregn - 4 - en-3,20-dione plates, M.P. 288 to 290° C., $[\alpha]_D^{20}+17°$ (c., 0.83 in pyridine).

The foregoing compound (1.3 g.) was suspended in acetic anhydride (15 ml.). Perchloric acid (2 drops, 72%) was added, and after 10 minutes the mixture was poured into water and the product isolated with ether. Chromatographic purification on alumina (30 g.) and crystallisation from acetone/hexane gave 17α-acetoxy-6,16α-dimethylpregna-4,6-diene-3,20-dione, prisms M.P. 202 to 204° C., $[\alpha]_D^{22}+21°$ (c., 0.99 in chloroform) $\lambda_{max}$. 286 m$\mu$, log $\epsilon$ 4.3.

EXAMPLE 2

Formula for 1,000 tablets:

Materials:
| | |
|---|---|
| 17α - acetoxy-6,16α-dimethyl-pregna - 4,6 - diene - 3,20-dione | 0.5 g. |
| Lactose, B.P. | 125 g. |
| Magnesium stearate | A sufficient quantity. |
| Starch paste, 10% | A sufficient quantity. |
| Starch B.P. | Sufficient to produce 150 g. |

Process

The steroid, lactose, and two-thirds of the starch are mixed together, moistened with a suitable quantity of starch paste and granulated through a No. 20 mesh screen.

The granule is dried at 50° C. again passed through a No. 20 mesh screen, and the magnesium stearate added, together with sufficient starch to produce the required weight. The granule is compressed to produce tablets each weighing 150 mg.

We claim:
1. 17α - acetoxy - 6,16α - dimethylpregna - 4,6-diene-3,20-dione.
2. A process for controlling fertility in animals comprising administering to the female animal a minor but effective quantity of 17α-acetoxy-6,16α-dimethylpregna-4,6-diene-3,20-dione.
3. A compound of the formula

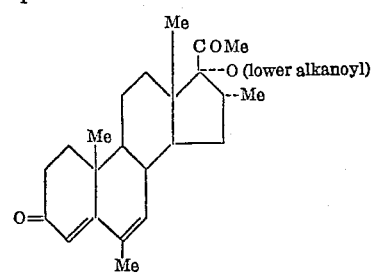

References Cited

UNITED STATES PATENTS

| 2,891,079 | 6/1959 | Dodson et al. | 260—397.4 |
| 3,028,381 | 4/1962 | Petrow et al. | 260—239.5 |
| 3,096,350 | 7/1963 | Iriarte et al. | 260—397.4 |

ELBERT I. ROBERTS, Primary Examiner.

LEWIS GOTTS, Examiner.